United States Patent [19]

Nishino et al.

[11] 4,180,482

[45] Dec. 25, 1979

[54] SELF-CLEANING CATALYTIC COATING

[75] Inventors: Atsushi Nishino; Kazunori Sonetaka; Kunio Kimura; Yoshihiro Watanabe, all of Kadoma, Japan

[73] Assignee: Matsushita Electric Industrial Co., Ltd., Kadoma, Japan

[21] Appl. No.: 915,260

[22] Filed: Jun. 13, 1978

[30] Foreign Application Priority Data

Aug. 24, 1977 [JP] Japan ................................. 52/102116

[51] Int. Cl.$^2$ .......................... B01J 29/06; A21B 1/00
[52] U.S. Cl. ............................. 252/455 R; 252/455 Z; 252/471; 252/477 R; 126/19 R; 428/450
[58] Field of Search ........... 252/455 R, 455 Z, 477 R, 252/471; 428/450; 126/19 R, 19 M

[56] References Cited

U.S. PATENT DOCUMENTS

| | | | |
|---|---|---|---|
| 3,266,477 | 8/1966 | Stiles | 126/19 R |
| 3,547,098 | 12/1970 | Lee | 126/19 R |
| 3,587,556 | 6/1971 | Moreland | 126/19 R |
| 3,988,514 | 10/1976 | Denny et al. | 126/19 R |

*Primary Examiner*—Carl Dees
*Attorney, Agent, or Firm*—Lowe, King, Price & Becker

[57] ABSTRACT

A coating formed on a surface of an article, which is heated during use as typified by a cooking device, to accomplish catalytic oxidation decomposition of oil and grease spattered thereon. The coating is fundamentally a porous matrix layer of an inorganic binder having a matte surface and comprises, in the form of uniformly dispersed particles, an oxidation catalyst and a nondiscoloring material, for example a ferrite, which has the effect of concealing a change in color of the oxidation catalyst resulting from its catalytic action. Preferably the coating comprises additionally a solid acid catalyst such as a zeolite as a decomposition-inducing catalyst in order to acquire an improved catalytic self-cleaning ability at relatively low temperatures such as 200°–300° C.

20 Claims, 5 Drawing Figures

SELF-CLEANING CATALYTIC COATING

BACKGROUND OF THE INVENTION

This invention relates to articles having a surface which is coated with a self-cleaning coating, and more particularly to an improvement on a self-cleaning coating applied to cooking devices.

In the field of cooking devices typified by ovens, it has been popularized to afford the walls or wall liners of the devices a catalytic self-cleaning ability, i.e. the ability of catalytically decomposing oils or greases spattered thereon to gaseous substances. According to U.S. Pat. No. 3,266,477 to Stiles, a self-cleaning wall is provided, for example, by forming a ceramic coating on the wall and applying oxidation catalyst particles to the surface of the coating such that the particles are partly embedded in the coating but mostly exposed to a cooking space. However, this method is considered to be unsuitable to practical applications since the catalyst particles are easily damaged by abrasion for various reasons during use of the devices, and hence the coating cannot retain its self-cleaning ability for a satisfactorily long period of time.

U.S. Pat. No. 3,547,098 to Lee proposes, as an improvement on the method of the Stiles patent, to smelt a mixture of an oxidation catalyst and a glass frit thereby to incorporate the catalyst homogeneously into the glass matrix. According to this patnet the mixture is smelted at a temperature above about 1200° C., i.e. above a vitrification temperature, followed by quenching in cold water to obtain a catalytic frit. A self-cleaning coating produced from the resultant frit is characterized in that the catalyst is fixed throughout the coating in a permanent manner, whereby the coating is highly resistant to abrasion and excellent in durability.

However, this method also has some shortcomings. As the most serious problem, the heating of the catalyst to a temperature above 1200° C. almost inevitably causes the activity of the catalyst to lower. At such a high temperature a metal oxide utilized as the catalyst readily reacts with a certain ingredient of the frit to turn into a stable compound, whose catalytic ability is only a fraction of that of the initial catalytic oxide. The uniform distribution of the catalyst (or its derivative) in the frit offers another problem that a metal base to be coated must be lined with a ceramic undercoat beforehand since firing of the catalytic frit directly onto the metal base tends to cause corrosion of the metal base by the action of the catalyst at a high temperature, e.g. about 800° C., necessary for firing. As a still another problem, firing of the catalytic frit onto the undercoat needs to be accomplished at a relatively high temperature, e.g. at about 700° C. or above, because the frit comprises a considerably large amount of catalyst and hence is rather poor in its adhering property. The employment of such a high firing temperature causes augmentation of dimensional errors of the metal base and as a consequence an increase in the number of unacceptable products.

U.S. Pat. No. 3,587,556 to Moreland teaches to form a self-cleaning coating by the steps of preparing a slip in which a glass frit is mixed with a powdered oxidation catalyst, applying the slip onto a metal base and firing the applied slip. The resultant coating has a porous matrix layer formed of the frit particles partially fused to bond to each other, and the catalyst particles are dispersed throughout this matrix layer. This type of self-cleaning coating is superior to the catalytic coating of the Stiles patent both in resistance to abrasion and durability of the self-cleaning ability, and is considered to be advantageous over the coating according to the Lee patent since the catalyst is not heated at such a high temperature as will cause lowering of its catalytic activity.

Besides, it has been proposed to utilize an alkali metal silicate in place of, or in combination with, a glass frit as the support for oxidation catalysts.

Thus, it is deemed a standard technique in the art of self-cleaning coatings to disperse a powdery oxidation catalyst uniformly in a porous matrix layer formed of an inorganic binder.

However, certain problems about this type of self-cleaning coatings remain unsolved.

One of such problems is that the oxidation catalyst, which is usually a metal oxide (or metal oxides), in the coating undergoes gradual reduction as the result of oxidation decomposition of oils spattered on and diffused into the coating and/or by the reducing effect of gas burner flame in the cooking device. The reduction of the catalyst results in lowering of its catalytic activity and, besides, in most cases accompanies a change in the color of the catalyst, meaning the occurrence of local and irregular discoloration of the self-cleaning coating which of course impairs the appearance of the coating. The Stiles patent proposes to revive (oxidize) the partially reduced catalyst on the coating by treatment with a solution of a strong oxidizing agent such as hydrogen peroxide, but it will be impossible to accomplish such a treatment in the home. This problem must be solved at the production stage.

Another problem is that conventional self-cleaning coatings require relatively high temperatures, e.g. about 300° C., to exhibit their ability to satisfaction, whereas such high temperatures are rarely realized in cooking devices. Actual cooking temperatures in most of current cooking devices seldom exceed 300° C., and sometimes the wall surfaces in these devices remain at temperatures considerably lower than an established cooking temperature, e.g. at about 250° C. or even below when the cooking temperature is 300° C. Oxidation decomposition of fatty acids, main components of oils and greases spattering onto a self-cleaning coating, proceeds rather slowly at temperatures realizable in cooking devices. For example, it takes about 30 minutes at temperatures of 250°–300° C. Even when a cooking temperature of 250°–300° C. is employed, in many cases heating is stopped before the lapse of 30 minutes after spattering of oils onto the self-cleaning coating, so that a considerable portion of the spattered matter remains undecomposed and adhered to the coating. Accordingly, there is a tendency that increasing quantities of oils or soils accumulate on the coating during repeated use of a cooking device, so that the accomplishment of a thorough decomposition of the spattered matter becomes more and more difficult. The difficulty is further augmented when the coating is significantly covered with oils or soils since in such a state the catalyst is not sufficiently supplied with air.

To summarize, conventional self-cleaning coatings are not yet fully satisfactory from a practical viewpoint.

SUMMARY OF THE INVENTION

It is an object of the present invention to solve the above described problems to catalytic self-cleaning coatings, particularly in cooking devices.

It is another object of the invention to provide a self-cleaning coating formed on a surface of an article, which is heated during use, to accomplish catalytic oxidation decomposition of oil or grease spattered thereon, which coating scarcely exhibits a perceptible discoloration during repeated use of the article.

It is still another object of the invention to provide a self-cleaning coating of the above described kind, which coating exhibits a high self-cleaning ability even at relatively low temperatures such as 200°–300° C. and long retains such ability.

It is a further object of the invention to provide a cooking device comprising on a surface thereof a self-cleaning coating of improved properties.

A self-cleaning coating according to the invention formed on a surface of an article, which is heated during use, to accomplish catalytic oxidation decomposition of oil or grease spattered thereon comprises a porous matrix layer of an inorganic binder containing a matting agent which affords a matte surface to this layer and a catalyst in the form of particles dispersed uniformly in the porous matrix layer. The catalyst is of the type catalyzing oxidation decomposition of oils and greases at elevated temperatures and comprises an oxidation-including component which has a tendency to undergo a change in color as the result of its catalytic action. The self-cleaning coating further comprises, as an essential ingredient, a material which is in the form of particles dispersed uniformly in the porous matrix layer and has such a color with stability that the aforementioned change in color is concealed, so that the coating scarcely exhibits a perceptible discoloration on the occurrence of the aforementioned change in color.

Preferably, the catalyst in this self-cleaning coating comprises a solid acid catalyst such as a zeolite as a decomposition-inducing component in addition to the aforementioned oxidation-inducing conponent, which is preferably a metal oxide selected from manganese dioxide, dimanganese trioxide and cupric oxide. Also it is preferable to use a compound metal oxide typified by ferrite as the discoloration-concealing material.

A preferable example of the inorganic binder is a borosilicate glass frit, and preferable examples of the matting agent are alumina, silica and titania.

A base which gives the surface to be coated with the self-cleaning coating may be any metal useful as a structural material and may be lined with an undercoat such as porcelain enamel layer.

The most importantly the invention is embodied in cooking devices typified by ovens.

DESCRIPTION OF PREFERRED EMBODIMENTS

Figure 1:
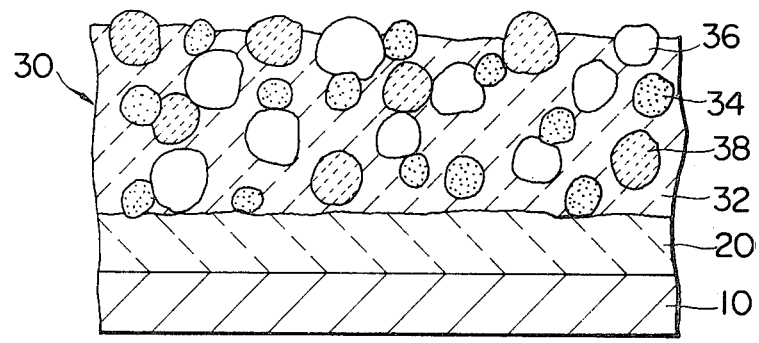
FIG. 1 shows a fundamental structure of a self-cleaning coating according to the present invention sectionally and schematically.

The illustration of FIG. 1 is presented for the aid of understanding a fundamental structure of a self-cleaning coating according to the invention. Indicated at 10 is a metal member coated with a porcelain enamel layer 20. There is no particular restriction for the materials of the metal base 10 and the enamel layer 20 insofar as the combination of the base 10 and the liner 20 can withstand high temperatures. As a typical example, the combination of the metal base 10 and the enamel liner 20 would be taken as a wall of a cooking oven exposed to grease spatters and other products resulting from heating food. A self-cleaning coating 30 according to the invention is fired onto the surface of the enamel liner 20. Microscopically, this coating 30 comprises a porous matrix 32 which is fundamentally of an inorganic binder such as a partially fused glass frit and contains a matting agent 34 to afford a matte surface to the coating 30. Dispersed uniformly in the binder matrix 32 are fine catalyst particles 36 which afford a self-cleaning property to the coating 30. Also dispersed uniformly in the binder matrix 32 are fine particles 38 of a non-discoloring material as a feature of this coating 30. Of course the binder 32 serves the function of bonding the particles 36 and 38 to each other and to the enamel liner 20. The coating 30 is composed of the above described ingredients but as a whole has a homogeneous and microscopically porous structure.

When the surface of the self-cleaning coating 30 is spattered with oil or grease and the coating 30 is maintained at elevated temperatures, for example at 200°–300° C., the catalyst particles 36 in the coating 30 induce the spattered oil or grease to decompose and to be oxidized into carbon dioxide and water. The coating 30, therefore, is of a self-cleaning type. At least a portion of the catalyst 36 in the coating 30 is a metal oxide (will be described hereinafter more in detail). In cases where the coating 30 is spattered with a large quantity of oil or grease, the oxidation of the spattered matter deprives the metal oxide of its oxygen since the coating 30 scarcely contains free oxygen, resulting in that at least a portion of the catalyst particles 36 exhibit discoloration due to reduction of the catalytic metal oxide to a lower oxide. For example, $MnO_2$, which is a popular oxidation catalyst black in color, will be reduced to $Mn_3O_4$ which is reddish brown. However, the non-discoloring material 38 makes little contribution to the oxidizing-cleaning function and does not change its color. Accordingly, when the coating 30 comprises a suitable amount of a non-discoloring material resembling in color to the catalytic metal oxide, for example a blackish ferrite in combination with $MnO_2$, the coating 30 does not appear to have changed its color in spite of the fact that the above described manner of discoloration has occurred in a microscopical view. In other words, the non-discoloring material 38 serves the function of hiding discoloration of the catalyst 36, or resultant staining of the coating 30, during use of the oven from the naked eyes and accordingly maintaining the original appearance of the coating 30 for a long period of time.

The ingredients of a self-cleaning coating according to the invention will be described respectively more in detail.

(1) Inorganic Binder

In general, a glass frit is suitable and convenient as the material for the inorganic binder in a self-cleaning coating according to the invention. Besides, alkali metal silicates such as sodium, potassium and/or lithium silicates are of use either singularly or in combination with a glass frit.

Various types of glass frits for metal coating use are on the market. They are classified into high temperature frits to be fired at temperatures above 750° C. (mainly for application to steel sheets) and low temperature frits to be fired at temperatures above 500° C. (mainly for application to aluminum sheets). As for the composition, commercial frits are classified into phosphate frits, lead frits and the most prevailing borosilicate frits. In principle, these frits are all of use in the present invention. It is preferable to use a frit that can be fired at temperatures above 500° C. with consideration of temperatures experienced on the wall surfaces in cooking devices. However, the use of a phosphate frit is undesirable because the preparation of this type of frit tends to cause environmental pollution. In the case of the invention being embodied in a cooking device, the use of a lead frit is undesirable from the viewpoint of preservation of food hygiene or safety to health. These conditions imply the suitableness of using a borosilicate frit. However, attention should be paid to the fact that most of borosilicate frits on the market contain $Sb_2O_3$, PbO and/or CdO, which are undesirable both from the viewpoints of hood hygiene and prevention of environmental pollution. It is preferable to use a borosilicate frit containing none of these harmful compounds.

From the consideration of both firing temperature and safety to health, the most preferable frit composition as the binder material in the present invention is as follows.

$SiO_2$: 15–60 Wt%
$B_2O_3$: 9–35 Wt%
$Na_2O$: 10–30 Wt%
$Li_2O$: 0–20 Wt%
$K_2O$: 0–10 Wt%
CaO: 0–10 Wt%
$Al_2O_3$: 1–25 Wt%

Another matter of importance is to use a frit having a suitable coefficient of thermal expansion relative to the expansion coefficient of the metal member to which the self-cleaning coating is applied. For example, the coefficient of thermal expansion in the temperature range of 100°–600° C. is $(130-150) \times 10^{-7} deg^{-1}$ for iron, $(170-180) \times 10^{-7} deg^{-1}$ for copper and $(200-300) \times 10^{-7} deg^{-1}$ for aluminum. In view of these values as well as temperatures the coated metal base such as an oven wall will experience, it is preferable to use a frit whose coefficient of expansion is $(85-150) \times 10^{-7} deg^{-1}$ for application to a steel base but $(130-170) \times 10^{-7} deg^{-1}$ for application to an aluminum base.

When the self-cleaning coating is formed on an undercoat such as a porcelain enamel, physical and chemical properties of the undercoat material should also be taken into account in selecting a frit.

It is undesirable to use a frit whose softening temperature is unduly high because firing of such a frit will possibly cause lowering of the activity of the catalyst and/or augmentation of dimensional errors of the metal base. The frit composition presented hereinbefore as the most preferable has a softening temperature in the range from 400° to 750° C.

(2) Matting Agent

Porcelain enamels for household appliances are usually fired under such a condition as gives a glossy surface for reasons of appearance and resistance to abrasion and scratch. The self-cleaning coating herein described, too, is a sort of porcelain enamel layer, but this coating is required to be porous and have a large specific surface area in order that oil is readily absorbed in the coating and comes into contact with the catalyst in the coating with the establishment of a large contact area. For this reason a matting agent, i.e. a substance that affords a rugged or matte surface to an enamel coating such that the coating acquires the property of irregularly reflecting a ray of light incident thereon, is used as an ingredient of the self-cleaning coating.

Typical examples of matting agents are alumina, silica, zirconia and titanium dioxide. It is a usual practice to mix a matting agent with a glass frit at the stage of preparing a slip, i.e. a paste or slurry containing the frit. If a matting agent is added to the raw materials for the frit, the fusion of the resultant mixture results in that the matting agent is incorporated into the glass structure and becomes a component of the glass, and hence the produced frit does not give a matte surface. When the same matting agent is mixed with a frit at the stage of preparing a slip, the matting agent does not react with the frit during firing of the slip on a substrate to be coated but can be dispersed in the resultant coating or glass matrix as an independent solid phase in particle form. Accordingly, a property requisite to a matting agent for use in a coating according to the invention is to be sufficiently heat-resistant and another is not to react with preferred frits at temperatures for firing the frits. These requirements are met by numerous oxides such as $Al_2O_3$, $SiO_2$, $TiO_2$, ZnO, CaO, MgO and $ZrO_2$. Of course it is possible to use two or more of these oxides jointly. Furthermore, use may be made of a variety of metal compounds which respectively give the above metal oxides when fired in air. In practice, however, the use of alumina, silica and/or titanium dioxide is most preferable.

Alumina is an excellent matting agent for a self-cleaning coating, and it suffices to utilize a commercial product. The properties of an alumina-containing self-cleaning coating is not influenced by the crystal modification of alumina, but $\alpha$-$Al_2O_3$ is the most suitable from an economical reason. It is possible to use an aluminum salt such as aluminum hydroxide or aluminum sulfate in place of alumina, but the use of alumina is preferred because in the case of converting an aluminum salt to alumina at the firing stage it is difficult to regulate the particle size of the resulting alumina.

As to silica, the use of commercially available silica of natural occurrence is fully satisfactory. Silica is a cheap material and serves as a good matting agent for a coating according to the invention.

Other than these oxides, some types of clays such as activated clay, Japanese acid clay, bentonite and kaolin are also of use as the matting agent in the present invention.

In the finished self-cleaning coating, the presence of the matting agent particles creates microscopical interstices in the glass matrix given by the frit and hence renders the matrix porous. The porosity of the glass matrix or the self-cleaning coating, therefore, can be controlled by varying the amount and/or particle size of the matting agent, though the porosity depends also on other factors such as the composition of the frit, firing temperature for forming the coating, and the type and amount of the catalyst.

The particle size of the matting agent influences the self-cleaning ability of the coating, too. When the particle size of the matting agent is too small, the ruggedness of the surface of the coating is very minute or, in other words, the matte surface is not far from a smooth surface. Since oil spattered onto such a surface is hardly absorbed in the coating, the oil is not completely decomposed and oxidized but turns into varnish-like (sticky) and unsightly residues. On the contrary, the use of too large matting agent particles causes the glass matrix to lower its strength or ability as a binder so that the coating as a whole becomes poor in its adherence and abrasion resistance. Besides, in this case the workability of the slip is impaired and hence it becomes difficult to produce the self-cleaning coating as an enamel layer of a good property. A preferred range of the particle size of the matting agent is 200 to 350 mesh.

Generally, the porosity of the self-cleaning coating increases and the self-cleaning ability of the coating is enhanced as the amount of the matting agent is increased. However, an increase in the amount of the matting agent causes lowering of the adhering strength and abrasion resistance of the coating since an increase in the amount of the matting agent means a relative decrease in the amount of the inorganic binder, naturally resulting in that the adherance of the coating to the metal base (or an undercoat) becomes insufficient and, besides, that the coating tends to crack due to an enlarged difference in the coefficient of thermal expansion between the coating and the metal base. From consideration of these tendencies, it is preferable that the matting agent amounts to 5-50 Wt%, more preferably 10-40 Wt%, of the self-cleaning coating.

(3) Catalyst

Main constituents of soils to be cleaned by the action of the catalyst in the self-cleaning coating are fatty acids of the class having about 15-22 carbon atoms, typified by palmitic acid, stearic acid, oleic acid, linolic acid and linolenic acid. The fatty acids undergo oxidation polymerization in a high temperature atmosphere and turn into food soils which adhere tightly to oven walls having no self-cleaning ability. The role of the catalyst in the self-cleaning coating is to induce or promote oxidation decomposition of these fatty acids in monomer form to gaseous substances such as carbon dioxide and water at moderately elevated temperatures. Accordingly, a metal oxide known as an oxidation catalyst is utilized as at least a portion of the catalytic component of a self-cleaning coating according to the invention.

As mentioned hereinbefore, oxidation decomposition of the aforementioned fatty acids by the action of a catalytic metal oxide at temperatures of 200°–300° C. takes a considerably long period of time. Presumably a primary reason for the slowness of the oxidation decomposition is that the oxidation decomposition is not accomplished by direct oxidation of the fatty acids but is accomplished in two stages: the first stage is the breakage of carbon bonds in the fatty acids and the second stage is the reaction of the resultant lower fatty acids with oxygen to yield carbon monoxide and water.

From the above consideration, it is highly preferable, and is a feature of the invention, that the self-cleaning coating comprises a substance which catalyzes the decomposition of fatty acids to lower fatty acids or other compounds together with a metal oxide that serves as an oxidation reaction.

(3-A) Oxidation Catalyst

A variety of metals and metal compounds are known as oxidation catalysts and have been proposed as catalytic components of self-cleaning coatings. In the present invention, manganese dioxide $MnO_2$, dimanganese trioxide $Mn_2O_3$ and cupric oxide $CuO$ are selected as preferable oxidation catalysts from collective considerations of chemical and physical properties of the individual catalytic substances as an ingredient of a self-cleaning coating, particularly with regard to safety for health, irrelevance to environmental pollution, catalytic activity on oils and fats, hardness of their particles and their coloring effect.

As to manganese oxides, electrolytic manganese dioxide $\gamma$-$MnO_2$ is the most suitable material with consideration of its catalytic activity and availability with constant purity and quality at stable cost. However, it is permissible to use a different type of manganese oxide or alternatively a manganese-containing material that gives either manganese dioxide or dimanganese trioxide by firing in air as exemplified by manganese carbonate and manganese ores.

As to cupric oxide, the use of basic copper carbonate $CuCO_3 \cdot Cu(OH)_2$ is preferable to the use of $CuO$ because when a slip for producing a self-cleaning coating contains basic copper carbonate the slip exhibits a good stability of its colloid and, by firing, gives a coating comprising cupric oxide of high catalytic activity.

The particle size of the oxidation catalyst, or its raw material, influences the stability of colloid in a slip for producing a self-cleaning coating and the activity of the catalyst in the produced coating. It is preferable, therefore, that the oxidation catalyst, or its raw material, has a mean particle size ranging from 0.8 to 20 $\mu$m, conditioning that at least 90 Wt% of the particles pass through a 325 mesh screen. The use of too large catalyst particles results in difficulty in obtaining a stable slip because of sedimentation of the catalyst particles in the slip. Moreover, there is the possibility that too large catalyst particles accumulate in a base region of the coating with the result that the catalyst cannot exhibit its inherent actibity and, undesirably, oxidizes or corrodes the metal base. The use of excessively small catalyst particles is also undesirable since such particles do not tend to uniformly disperse in the slip but tend to float on the surface of the slip. Moreover, a self-cleaning coating comprising excessively small catalyst particles can hardly have a good matte surface, and sometimes minute cracks tend to appear in such a coating.

It is suitable that the oxidation catalyst amounts to 50–50 Wt% of the essential solid matter in a slip for producing a self-cleaning coating. In other words, the oxidation catalyst in the coating amounts of 5-50 Wt% of the total weight of the binder, matting agent, non-discoloring material and catalyst. If the amount of the oxidation catalyst is less than 5 Wt%, the coating will be unsatisfactory in its self-cleaning ability, and it will be rather difficult to afford a desired color to the coating. On the other hand, a self-cleaning coating comprising more than 50 Wt% of oxidation catalyst tends to become unsatisfactory in its mechanical strength and adherence to the metal base or an undercoat.

(3-B) Decomposition Catalyst

A solid acid catalyst is of use in the present invention for catalyzing the decomposition of oils and fats.

"Solid acid" refers generally to a solid substance that has the property of acid, i.e. a substance capable of giving up protons or capable of accepting an electron pair. A catalytic substance which can be defined as a solid acid is called a solid acid catalyst. In general, the catalytic activity of a solid acid catalyst exhibits a sharp augmentation with a rise in the rate of ion exchange probably because of the formation of a strong acid point, that is, a position where the property of acid is retained, through ion exchange.

Examples of solid acid catalysts useful in the present invention are natural zeolites, synthetic zeolites, Japanese acid clay and activated clay, including derivatives of these substances, and furthermore, alumina-silica, silica-magnesia and alumina-boria systems. Among these, preference is given to natural and synthetic zeolites.

Natural zeolites refer to a wide variety of minerals belonging to the zeolite family of minerals and are aluminosilicates containing other metal element(s) such as Na, Ca and/or Mg. According to classification of silicate minnerals, natural zeolites belong to lactosilicates (crystallographically characterized by a sterical network structure).

Natural zeolites, which can be classified into natrolite group, laumontite group, gismondite group, heulandite group, stilbite group, phillipsite group and others, are brought into the market through the processes of heat drying a raw ore, pulverizing the dried ore and sieving the powder into a suitable range of particle size.

Synthetic zeolites have been developed since the middle 1940s and now are marketed in wide variety of compositions. Generally synthetic zeolites are expessed by the following formula, representing monovalent and divalent metal ions by $M^I$ and $M^{II}$, respectively.

$$(M_2{}^I, M^{II})O.Al_2O_3.nSiO_2.mH_2O$$

At present synthetic zeolites are widely used as molecular sieves. Typical examples are Zeolite A, Zeolite X, Zeolite Y and Zeolite L all produced by Union Carbide Corp.

A self-cleaning coating comprising both a solid acid catalyst of the above described class and an oxidation catalyst (the above described oxide of manganese or copper) is excellent in its catalytic activity or self-cleaning ability even at relatively low temperatures and retains such ability for a long period of time. Though the reason for such properties of the coating and the mechanism of the participation of the solid acid catalyst in the breakage of carbon bonds of fatty acids have not yet been fully confirmed, the manner of contribution of a synthetic zeolite to the self-cleaning process may be explained as follows.

A zeolite gives a strong solid acid by the exchange of its alkali metal ion for a divalent or trivalent metal ion or a hydrogen ion. The acidity of such a solid acid is far stronger than that of a typical silica-alumina catalyst. The formation of such a strong solid acid is believed to be the origin of the catalytic action of zeolites on fatty acids. This property of zeolites has attracted much attention and now is of industrial importance in catalytic cracking of petroleum and also in a variety of catalytic carbonium ion reactions.

The oxidation decomposition of oils or fatty acids at elevated temperatures by the action of a synthetic zeolite and an oxidation catalyst is considered to be accomplished through the following reactions, wherein Me represents a monovalent metal atom.

$$R-COOH \rightleftharpoons R-COO^- + H^+ \quad (1)$$

$$(Me)O.Al_2O_3.nSiO_2.mH_2O + H^+ \rightarrow {}^{(H)O.Al}2O_3.nSiO_2.mH_2O + Me^+ \quad (2)$$

$$R-COO^- + Me^+ \rightarrow R-COOMe \quad (3)$$

$$2(R-COOMe) \rightarrow R-CO-R + MeCO_3 \quad (4)$$

$$MeCO_3 \rightarrow MeO + CO_2 \quad (5)$$

$$MeO + H_2O \rightarrow MeOH + H_2 \quad (6)$$

$$(H)O.Al_2O_3.nSiO_2.mH_2O + MeOH \rightarrow (Me).O.Al_2O_3.nSiO_2.mH_2O + H_2O \quad (7)$$

$$R-CO-R + H_2 \rightarrow R.RCHOH \quad (8)$$

$$R \cdot RCHOH \xrightarrow[(MnO_2)]{O_2} CO_2 + H_2O \quad (9)$$

Equation (1) shows the ionization of a carbonic acid R—COOH, and Equation (2) shows the occurrence of ion exchange of the metal Me in the zeolite for H+ given by the ionization. Then the zeolite turns into a strong solid acid catalyst. The anion R—COO⁻ formed by the ionization of the carbonic acid reacts with the cation Me+ give by the ion exchange according to Equation (3). The salt R—COOMe formed by this reaction undergoes decarboxylation reaction of Equation (4) and gives a ketone R—CO—R and the carbonate of the metal Me. This carbonate decomposes to carbon dioxide gas and an oxide of the metal Me as expressed by Equation (5). This oxide is highly hygroscopical and hence turns into the hydroxide of Me with liberation of hydrogen gas as shown by Equation (6). The zeolite that has undergone the ion exchange of Equation (2) is revived by reaction with the metal hydroxide as expressed by Equation (7). Meanwhile, the ketone formed by the reaction of Equation (4) is reduced to a secondary alcohol by the hydrogen gas resulting from the reaction of Equation (6). Equation (8) shows this reduction reaction. As represented by Equation (9), this alcohol reacts with oxygen in air by the catalytic action of, for example, $MnO_2$ and decomposes to carbon dioxide and water.

A solid acid catalyst may be used as a sole catalytic component of a self-cleaning coating, but it is much more desirable to use a solid acid catalyst, preferably a zeolite, together with an oxidation catalyst (metal oxide) as will have been understood from the foregoing description. By making joint use of these two kinds of catalysts, it becomes possible to obtain a self-cleaning coating which exhibits a high cleaning ability over a wide range of temperature extending from about 200° C. to about 300° C.

It is suitable that a solid acid catalyst amounts to 5–50 Wt% of the essential solid matter in a slip for producing a self-cleaning coating. In other words, the solid acid catalyst in the coating amounts to 5–50% of the total weight of the binder, matting agent, oxidation catalyst, solid acid catalyst and non-discoloring material. If the amount of the solid acid catalyst is less than 5 Wt%, the coating can hardly be regarded as a dual catalyst coating so that the oil cleaning ability of the coating does not appreciably differ from that of a corresponding coating which comprises a metal oxide (oxidation catalyst) as a sole catalytic component. When the amount of the solid acid catalyst in the coating is made more than 50 Wt%, the coating tends to crack and/or become unsatisfactory in its adherence.

As will be understood from the preceding description of the matting agent, a solid acid catalyst such as a zeolite serves also as a matting agent for the coating.

(4) Non-discoloring Material

A discoloration-concealing material or non-discoloring material is an additive characteristic of a self-cleaning coating according to the invention and plays the role of preventing a perceptible discoloration of the coating while the catalyst in the coating particpates in oxidation decomposition of spattered oils or is exposed to a reducing flame. Accordingly use should be made of a substance which matches with the catalyst in color and does not discolor when heated in either an oxidizing or reducing atmosphere.

The mechanism of discoloration of a self-cleaning coating accompanying the catalytic oxidation effect of the coating is summarized as follows.

Cleaning or oxidation decomposition of oil or grease spattered onto the coating is accomplished with the coating surface exposed to air. When, however, the spattered matter is large in quantity and diffuses into the coating, the diffused portion of the oil can hardly react with oxygen in air but takes oxygen away from the oxidation catalyst particles in the coating, so that the cleaning is accomplished in this case, too, but with the accompaniment of partial reduction of the oxidation catalyst, i.e. metal oxide, to a lower oxide. The reduced portion of the oxidation catalyst exhibits a change in color, so that there occurs a local discoloration of the coating. For example, the most suitable catalytic metal oxides $MnO_2$ and $CuO$ undergo discoloring reduction in the following ways, respectively.

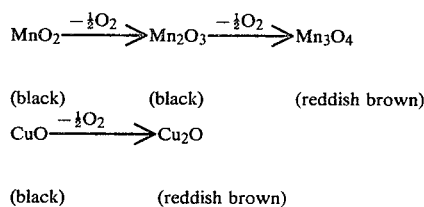

When the coating comprises a black or blackish brown substance as a non-discoloring material together with either $MnO_2$ or $CuO$, the non-discoloring material serves the function of hiding the local discoloration of the coating attributed to partial reduction of the catalytic oxide, so that the coating appears to be unchanged in color.

The non-discoloring material is desired to be chemically stable, but it is permissible also to use a substance which may be reduced with no change in color under a condition where the catalytic oxide is reduced. Since the preferred oxidation catalysts, manganese dioxide, dimanganese trioxide and cupric oxide, are all black in color (accordingly a self-cleaning coating according to the invention appears usually blackish brown), it is preferable to use a black or blackish substance as the non-discoloring material. Taking into consideration other factors, too, the use of a ferrite is the most preferable.

Ferrites are a group of compound metal oxides black or blackish brown in color and expressed generally by $MO \cdot Fe_2O_3$, where M represents a divalent metal atom such as Mn, Fe, Co, Ni, Cu or Zn. Accordingly any ferrite matches in color with the matrix containing the catalytic oxide and is effective for concealment of the discoloration of the catalytic oxide. A higher concealment effect can be gained by using a ferrite comprising a relatively large amount of iron oxides. However, it will be understood from the foregoing description that the color of the non-discoloring material in the present invention is not limited to black or blackish brown.

The particle size of the non-discoloring material is desired to be nearly the same as that of the oxidation catalyst in order that this material be uniformly distributed in the coating along with the catalyst and fully exhibit its concealment effect.

The amount of the non-discoloring material in the coating is also a matter of importance. It is desirable to use 0.1 to 5 parts by weight, more preferably 0.3–5 parts by weight, of non-discoloring material per one part by weight of oxidation catalyst, conditioning that the non-discoloring material amounts to 3–40%, more preferably 5–40%, of the total weight of the coating. When the weight ratio of the non-discoloring material to the oxidation catalyst is smaller than 1/10, the discoloration of the catalyst will become perceptible. On the other hand, the use of more than 5 parts by weight of non-discoloring material to one part of oxidation catalyst lowers the self-cleaning ability of the coating. When the amount of the non-discoloring material is less than 3 Wt% of the coating while the weight ratio of this material to the oxidation catalyst is as specified above, the self-cleaning ability of the coating becomes insufficient due to the smallness of the catalyst content. To increase the amount of this material beyond 40 Wt% of the coating is also unfavorable because an accompanying increase in the amount of the catalyst makes it difficult to obtain a good matte surface.

(5) Mill Additives

Optionally any material known as mill additive in conventional enameling techniques may be used in the production of a self-cleaning coating according to the invention. For example, the following materials may be used either singularly or in combinations: water glass, boric acid, borax, zinc oxide, sodium nitrite, urea, magnesium chloride, powdered metals, crystallized cellulose, gum arabic, polystyrene, polytetrafluoroethylene, polyvinyl alcohol and polyethylene. Besides, use may be made of a composition characterized by a large specific surface area.

The invention will be illustrated by the following examples.

EXAMPLE 1

An aluminized steel sheet measuring 50 mm by 90 mm and 0.6 mm thick was cleansed of grease and washed, and a conventional porcelain enamel for enameling aluminum was fired onto this sheet to form a base coat.

The following composition was weighed and mixed in a ball mill for 2 hr.

|  | Parts by weight |
| --- | --- |
| Glass frit | 100 |
| Catalyst ($\gamma$-$MnO_2$) | 20 |
| Matting agent ($\alpha$-$Al_2O_3$) | 30 |
| Non-discoloring material (ferrite) | 10 |
| Mill additive (water glass) | 8 |
| Mill additive (borax) | 5 |
| Water | 80 |

The frit consisted of, by weight, 50% of $SiO_2$, 12% of $B_2O_3$, 18% of $Na_2O$, 4% of $Li_2O$, 2% of $K_2O$, 5% of $CaO$ and 9% of $Al_2O_3$ and had a softening temperature of 535° C. The ferrite was Toda Kogyo Corp. F-MZ, which was composed of 54.05 mol% of $Fe_2O_3$, 27.25 mol% of MnO and 18.70 mol% of ZnO.

The wet composition was applied onto the base coat by spraying and fired at 540° C. for 5 min to form a 200 μm thick coating.

The surface of this coating was dotted with six tiny lumps of lard weighing 50 mg in total and then was heated at 250° C. for 30 min. This test resulted in 40% reduction in the total weight of the lard. (In the examples, "self-cleaning ability" of a catalytic or self-cleaning coating implies such a reduction in the weight of oil or fat heated on the coating.) In a similar test wherein the coating dotted with lard was heated at 300° C. for 30 min, the weight reduction of the lard or self-cleaning ability of the coating reached 80%. For comparison, the same test was made on a coating given by excluding the non-discoloring material (ferrite) from the above composition. In this case the self-cleaning ability was 38% at 250° C. and 79% at 300° C.

Then the coatings were each exposed to a reducing flame of a gas burner for 1 min. No discoloration was observed by the naked eyes on the coating containing the ferrite, whereas reddish brown stains appeared over the entire areas of the coating prepared as comparison standard with omission of the ferrite.

EXAMPLE 2

The ferrite-containing and ferrite-omitted coatings according to Example 1 were immersed in salad oil so that the surface of each coating was entirely wetted with salad oil. All the samples were heated in this state at 300° C. for 30 min. As the result the ferrite-containing coating exhibited slight discoloration though only in its limited areas. In contrast, the ferrite-omitted coating discolored into reddish brown in almost every region of its surface area.

EXAMPLE 3

A 50×90 mm and 0.6 mm thick steel sheet was removed from grease, subjected to acid-treatment, coated with nickel and washed, and a conventional porcelain enamel was fired onto the nickel-coated surface of this sheet to give a base coat.

Using the frit used in Example 1 as a binder, the following composition was weighed and mixed in a ball mill for 2 hr.

|  | Parts by weight |
| --- | --- |
| Frit | 100 |
| Catalyst A ($\gamma$-$MnO_2$) | 10 |
| Catalyst B (synthetic zeolite) | 20 |
| Non-discoloring material (ferrite) | 30 |
| Mill additive (clay, bentonite, $NaNO_2$ and urea) | 2 |
| Water | 60 |

The synthetic zeolite, which served also as a matting agent, was ZEOLAM F-9 produced by Toyo Soda Manufacturing Co. The ferrite was the one used in Example 1.

The wet composition was applied onto the base coat and fired at 640° C. for 5 min thereby to give a 200 μm thick coating.

The surface of this coating was dotted with six tiny lumps of lard weighing 50 mg in total and then was heated for 30 min at 200° C. in one case but at 250° C. in another case. The self-cleaning ability of this coating was 35% in the case of 200° C. heating and 60% at 250° C. After the application of a reducing flame of a gas burner to the surface of this coating for 2 min, no change was perceived in the appearance, particularly with respect to the color, of the coating.

EXAMPLE 4

The following composition was weighed and mixed in a ball mill for 2 hr, and the resultant wet composition was applied onto the aluminized steel sheet employed in Example 1 and fired at 300° C. for 5 min thereby to give a 300 μm thick coating.

|  | Parts by weight |
| --- | --- |
| 50% aqueous solution of sodium metasilicate | 50 |
| Catalyst ($\gamma$-$MnO_2$) | 40 |
| Matting agent ($\alpha$-$Al_2O_3$) | 20 |
| Non-discoloring material (ferrite) | 20 |

The ferrite was the one used in Example 1.

This coating was exposed to a reducing flame of a gas burner for 2 min but exhibited no perceptive discoloration.

EXAMPLE 5

Fifteen different kinds of self-cleaning coatings respectively of the compositions (dry weight) shown in Tables 1A and 1B were each formed on the base coat according to Example 3. The frit, non-discoloring material (ferrite), and the mill additive in Tables 1A and 1B were all the same as those used in Example 3.

Discoloring and cracking tendencies of these coatings were examined by exposing each coating to a reducing flame of a gas burner (with a distance of 50 mm) for 1 min, and, for some of these coatings, their self-cleaning ability was examined by dotting the surface of each coating with six lard lumps weighing 50 mg in total and heating the coating at 300° C. for 30 min. The test results are also presented in Tables 1A and 1B.

Table 1A

| Sample No. | 5-1 | 5-2 | 5-3 | 5-4 | 5-5 | 5-6 | 5-7 |
| --- | --- | --- | --- | --- | --- | --- | --- |
| Composition (parts by Wt.) | | | | | | | |
| Frit | 68.0 | 67.5 | 65.5 | 58.5 | 53.5 | 43.5 | 33.5 |
| Catalyst ($\gamma$-$MnO_2$) | 10 | 10 | 10 | 10 | 10 | 10 | 10 |
| Non-discoloring material (ferrite) | 0.5 | 1 | 3 | 10 | 30 | 40 | 50 |
| Matting agent ($\alpha$-$Al_2O_3$) | 20 | 20 | 20 | 20 | 5 | 5 | 5 |
| Mill additive | 1.5 | 1.5 | 1.5 | 1.5 | 1.5 | 1.5 | 1.5 |
| Discoloration | yes, entirely | yes, partly | no | no | no | no | no |
| Cracking | no | no | no | no | no | slightly | yes |
| Self-cleaning ability | — | — | — | — | — | — | — |

Table 1B

| Sample No. | 5-8 | 5-9 | 5-10 | 5-11 | 5-12 | 5-13 | 5-14 | 5-15 |
| --- | --- | --- | --- | --- | --- | --- | --- | --- |
| Composition (parts by Wt.) | | | | | | | | |
| Frit | 53.5 | 53.5 | 53.5 | 53.5 | 53.5 | 53.5 | 53.5 | 53.5 |
| Catalyst | | | | | | | | |

Table 1B-continued

| Sample No. | 5-8 | 5-9 | 5-10 | 5-11 | 5-12 | 5-13 | 5-14 | 5-15 |
|---|---|---|---|---|---|---|---|---|
| ($\gamma$-MnO$_2$) | 24 | 22 | 20 | 15 | 12.5 | 10 | 7.5 | 5 |
| Non-discoloring material (ferrite) | 1 | 3 | 5 | 10 | 12.5 | 15 | 17.5 | 20 |
| Matting agent ($\alpha$-Al$_2$O$_3$) | 20 | 20 | 20 | 20 | 20 | 20 | 20 | 20 |
| Mill additive | 1.5 | 1.5 | 1.5 | 1.5 | 1.5 | 1.5 | 1.5 | 1.5 |
| Discoloration | yes, entirely | yes, partly | no | no | no | no | no | no |
| Self-cleaning ability (%) | 89 | 88 | 88 | 87 | 85 | 83 | 80 | 70 |

EXAMPLE 6

A 90×50 mm and 0.7 mm thick steel sheet was enameled by a conventional firing technique (at 850° C.) to form a 70–100 μm thick base coat on its each side.

A wet composition prepared by mixing the following materials in a ball mill for 2 hr was applied onto the base coat and fired at 680° C. to give a 200 μm thick self-cleaning coating (referred to as coating 6-A). The frit, ferrite and synthetic zeolite were those used in Example 3.

|  | Parts by weight |
|---|---|
| Frit | 100 |
| $\gamma$-MnO$_2$ | 5 |
| Synthetic zeolite | 20 |
| Non-discoloring material (ferrite) | 15 |
| Matting agent ($\alpha$-Al$_2$O$_3$) | 20 |
| Urea | 0.6 |
| Clay | 2 |
| Water | 60 |

For comparison, another coating (referred to as coating 6-B) was formed generally in the same way except for replacement of the zeolite by the same amount of $\alpha$-Al$_2$O$_3$.

Figure 2:
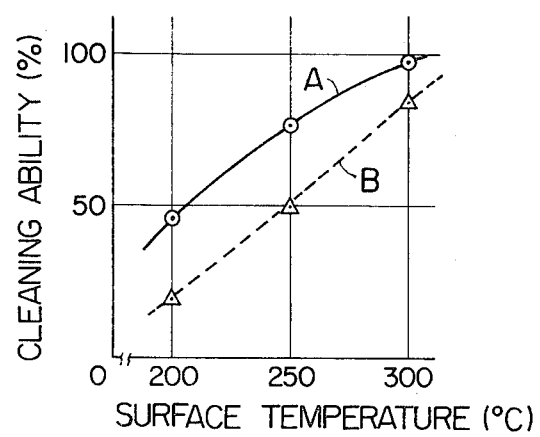
FIGS. 2 and 5 are graphs showing the self-cleaning ability of two kinds of coatings according to the invention.

The surface of each of the coatings 6-A and 6-B was studded with a hundred lumps of lard each weighing about 50 mg and heated for 30 min. To examine a variation in the self-cleaning ability of each coating with heating temperature, the test was made at 200° C., 250° C. and 300° C. (temperatures on the surface of each coating), using a new test piece for testing at each temperature. The result is presented graphically in FIG. 2.

Figure 3:
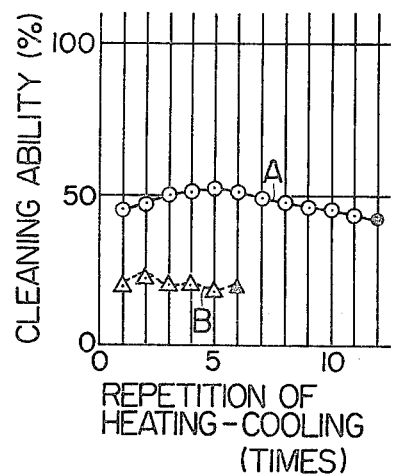
FIGS. 3 and 4 are graphs showing the durability of the self-cleaning ability of the aforementioned coatings.
Figure 4:
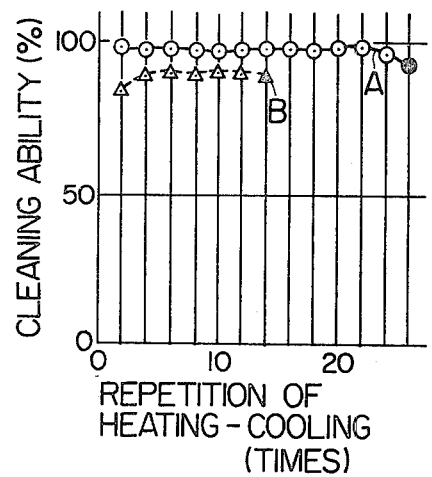

In a separate test, the surface of each of the coatings 6-A and 6-B was studded with a hundred lumps of lard each weighing about 50 mg and heated at 200° C. for 30 min, followed by measurement of the weight reduction of the lard. This test was made repeatedly on the same test piece to examine durability of the self-cleaning ability of the tested coating. The result is presented graphically in FIG. 3. This test was made also at a heating temperature of 300° C. with the result as shown in FIG. 4. In the graphs of FIGS. 3 and 4, the black circles or triangles indicate the appearance of black and varnish-like carbonaceous residues (originated from the lard) on the tested coating.

Figure 5:
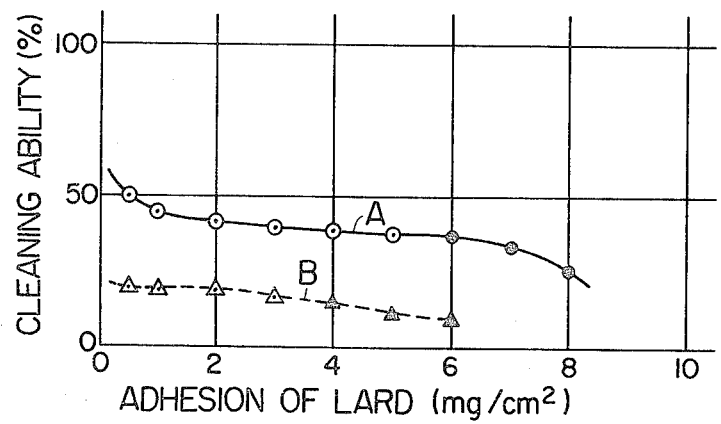

In a still separate test, lard was applied to each coating in a various quantity per unit area, and each test piece was heated at 200° C. for 30 min. FIG. 5 shows the result of this test, i.e. the relationship between the quantity of the applied lard and self-cleaning ability of each coating. The black circles and triangles in this graph indicate the same as the black marks in FIGS. 3 and 4.

The test results in this example demonstrate the superiority of the coating 6-A that comprises both a metal oxide ($\gamma$-MnO$_2$) and a solid acid (zeolite) as catalytic components to the coating 6-B that comprises $\gamma$-MnO$_2$ as a sole catalytic component. For example, the self-cleaning ability of the coating 6-A at 250° C. (FIG. 2) was about 150% of that of the coating 6-B and was nearly comparable to the self-cleaning ability exhibited by the coating 6-B at 300° C. FIGS. 3 and 4 show that the durability of the self-cleaning ability of the coating 6-A is about twice as long as that of the coating 6-B.

Neither of the coatings 6-A and 6-B exhibited any perceptive discoloration when exposed to a reducing flame according to Example 1.

EXAMPLE 7

The following composition was weighed and mixed in a ball mill for 6 hr.

|  | Parts by weight |
|---|---|
| Frit | 100 |
| CuCO$_3$ . Cu(OH)$_2$ | 50 |
| Synthetic zeolite | 20 |
| $\alpha$-Al$_2$O$_3$ | 20 |
| Ferrite | 20 |
| Bentonite | 0.3 |
| Water | 100 |

The zeolite and ferrite were those used in Example 3, and the frit was a 35/35/30 mixture (by Wt.) of Japan Ferro Corp. No. 2232, No. 2236 and No. 2240 frits.

The wet composition was passed through a 100 mesh screen and then applied onto a test piece prepared according to Example 3, followed by firing at 800° C., to give a 200 μm thick self-cleaning coating (referred to as coating 7-A). An analogous coating (referred to as coating 7-B) was given by the same procedure except for replacement of the synthetic zeolite by the same amount of $\alpha$-Al$_2$O$_3$.

The surface of the coating 7-A was studded with a hundred lumps of lard each weighing about 50 mg and heated at 300° C. for 30 min, with the result that the self-cleaning ability of the coating 7-A in this case was 98%. When this test was made repeatedly on both the coatings 7-A and 7-B, black carbonaceous residues appeared on the coating 7-A after the completion of 25 cycles of heating, whereas the same appeared on the coating 7-B after 11 cycles of heating.

The coatings 7-A and 7-B were also subjected to the test described in Example 6 in connection with FIG. 5, with the result that the self-cleaning ability of the coating 7-A was about twice as high as that of the coating 7-B for each quantity (per unit area) of the applied lard.

No discoloration was perceived on the coatings 7-A and 7-B when they were exposed to a reducing flame according to Example 1.

EXAMPLE 8

The self-cleaning coating of Example 1 was immersed in a solution prepared by dissolving 20 g of chloroplatinic acid in 1000 ml of ethanol, followed by air drying and heating at 500° C. for 10 min. As the result, platinum was deposited on the coating in an amount of 0.2 mg per 1 cm² of apparent surface area.

The surface of the platinum-deposited coating was studded with a hundred lumps of lard each weighing about 50 mg and heated for 30 min at 200° C. or at 250° C. The self-cleaning ability of the coating was 80% in the case of heating at 200 and 99% at 250° C.

What is claimed is:

1. In an article to be heated during use having a self-cleaning coating formed on a surface thereof that decomposes oils and greases spattered thereon to gaseous substances by catalytic oxidation, in which said self-cleaning coating comprises a porous matrix layer of an inorganic binder containing a matting agent which affords a matte surface to said matrix layer; a catalyst in the form of particles dispersed uniformly in said matrix layer, said catalyst comprising an oxidation catalyst that catalyzes oxidative decomposition of fatty acids at elevated temperatures and that has a tendency to undergo a change in color as the result of its catalytic action; the improvement comprising said coating containing a double oxide which is in the form of particles dispersed uniformly in said matrix layer and has such a color with stability that said change in color of said oxidation catalyst is concealed, whereby said self-cleaning coating scarcely exhibits a perceptible discoloration on the occurrence of said change in color.

2. An article as claimed in claim 1, wherein said oxidation catalyst is at least one metal oxide selected from the group consisting of manganese dioxide, dimanganese trioxide and cupric oxide, and wherein said double oxide resembles the color of said oxidation catalyst.

3. An article as claimed in claim 2, wherein the catalyst comprising said oxidation catalysts further comprises a solid acid catalyst that has the ability to catalyze thermal decomposition of oils and greases.

4. An article as claimed in claim 3, wherein said solid acid catalyst is a zeolite.

5. An article as claimed in claim 3, wherein said solid state catalyst is selected from the group consisting of Japanese acid clay, activated clay, silica-alumina, silica-magnesia and alumina-boria.

6. An article as claimed in claim 1, wherein said double oxide is at least one ferrite having the general formula $MO.Fe_2O_3$, wherein M represents a divalent metal atom selected from the group consisting of Mn, Fe, Co, Ni, Cu and Zn.

7. An article as claimed in claim 6, wherein each of said oxidation catalyst and said solid acid catalyst amount to 5 to 50% by weight of the total of said inorganic binder, said matting agent, said double oxide and said catalyst.

8. An article as claimed in claim 1, wherein said inorganic binder is a partially fused borosilicate glass frit having a softening temperature in the range from 400° to 750° C.

9. An article as claimed in any of claims 2, 3, 4, 5, 6, 7, 8 or 1, wherein the amount of said double oxide is 10 to 500% by weight of said oxidation catalyst and is 3 to 40% by weight of said self-cleaning coating.

10. In a cooking device having means for heating a cooking space and having a self-cleaning coating formed on a surface thereof facing the cooking space, said coating decomposing oils and greases spattered thereon to gaseous substances by catalytic oxidation and comprising a porous matrix layer of an inorganic binder containing a matting agent which affords a matte surface to said matrix layer; a catalyst in the form of particles dispersed uniformly in said matrix layer, said catalyst comprising an oxidation catalyst that catalyzes oxidative decomposition of fatty acids at elevated temperatures and that has a tendency to undergo a change in color as the result of its catalytic action; the improvement comprising said coating containing a double oxide which is in the form of particles dispersed uniformly in said matrix layer and has such a color with stability that said change in color of said oxidation catalyst is concealed, whereby said self-cleaning coating scarcely exhibits a perceptible discoloration on the occurrence of said change in color.

11. A cooking device as claimed in claim 10, wherein said catalyst further comprises a solid acid catalyst that has the ability to catalyze thermal decomposition of oils and greases, wherein said oxidation catalyst is at least one metal oxide selected from the group consisting of manganese dioxide, dimanganese trioxide and cupric oxide, and wherein said double oxide resembles the color of said oxidation catalyst.

12. A cooking device as claimed in claim 11, wherein said solid acid catalyst is a zeolite, and wherein each of said oxidation catalyst and said solid acid catalyst amounts to 5 to 50% by weight of the total of said inorganic binder, said matting agent, said double oxide and said catalyst.

13. A cooking device as claimed in claim 12, wherein said double oxide is at least one ferrite having the general formula $MO.Fe_2O_3$ wherein M represents a divalent metal atom selected from the group consisting of Mn, Fe, Co, Ni, Cu and Zn; the amount of said double oxide being 10 to 500% by weight of said oxidation catalyst and 3 to 40% by weight of said self-cleaning coating.

14. A cooking device as claimed in claim 13, wherein said matting agent is an oxide selected from the group consisting of alumina, silica and titania, the amount of said matting agent being 5 to 50% by weight of said self-cleaning coating.

15. A cooking device as claimed in any of claims 11, 12, 13, 14 or 10, wherein said inorganic binder is a partially fused borosilicate glass frit which has a softening temperature in the range from 400° to 750° C.

16. An article as claimed in claim 7, wherein said matting agent is an oxide selected from the group consisting of alumina, silica and titania, the amount of said matting agent being 5 to 50% by weight of said self-cleaning coating.

17. An article to be heated during use having a self-cleaning coating formed on a surface thereof that decomposes oils and greases spattered thereon to gaseous substances by catalytic oxidation, wherein said self-cleaning coating comprises a porous matrix layer made of a partially fused borosilicate glass frit having a softening temperature in the range from 400° to 750° C.; a matting agent which is dispersed in said matrix layer to afford a matte surface to said layer and being an oxide selected from the group consisting of alumina, silica and titania; a catalyst in the form of particles dispersed uniformly in said matrix layer, said catalyst comprising at least one metal oxide selected from the group consisting of manganese dioxide, dimanganese trioxide and cupric oxide as an oxidation catalyst which catalyzes oxidation of fatty acids at elevated temperatures and has a tendency to undergo a change in color as the result of its catalytic action; and a ferrite expressed by the general formula $MO.Fe_2O_3$, wherein M represents a divalent metal atom selected from the group consisting of Mn, Fe, Co, Ni, Cu and Zn, said ferrite having such a color with stability that said change in color of said oxidation catalyst is concealed, said ferrite resembling the color of said oxidation catalyst and being in the form of particles dispersed uniformly in said matrix layer, the amount of said ferrite ranging from 10 to 50% by weight of said oxidation catalyst and from 3 to 40% by weight of said self-cleaning coating, whereby said self-cleaning coating scarcely exhibits a perceptible discoloration on the occurrence of said change in color.

18. An article as claimed in claim 17, wherein said catalyst further comprises a zeolite as a cracking catalyst which catalyzes thermal decomposition of oils and fats; each of said oxidation catalyst and said zeolite amounting to 5 to 50% by weight of the total of said glass frit, said matting agent, said ferrite and said catalyst.

19. A cooking device having means for heating a cooking space and having a self-cleaning coating formed on a surface thereof facing the cooking space, said coating decomposing oils and greases spattered thereon to gaseous substances by catalytic oxidation and comprising a porous matrix layer made of partially fused borosilicate glass frit having a softening temperature in the range from 400° to 750° C.; a matting agent which is dispersed in said matrix layer to afford a matte surface to said layer and being an oxide selected from the group consisting of alumina, silica and titania; a catalyst in the form of particles dispersed uniformly in said matrix layer, said catalyst comprising at least one metal oxide selected from the group consisting of manganese dioxide, dimanganese trioxide and cupric oxide as an oxidation catalyst which catalyzes oxidation of fatty acids at elevated temperatures and has a tendency to undergo a change in color as the result of its catalytic action; and a ferrite expressed by the general formula $MO \cdot Fe_2O_3$, wherein M represents a divalent metal atom selected from the group consisting of Mn, Fe, Co, Ni, Cu and Zn, said ferrite having such a color with stability that said change in color of said oxidation catalyst is concealed, said ferrite resembling the color of said oxidation catalyst and being in the form of particles dispersed uniformly in said matrix layer, the amount of said ferrite ranging from 10 to 500% by weight of said oxidation catalyst and from 3 to 40% by weight of said self-cleaning coating, whereby said self-cleaning coating scarcely exhibits a perceptible discoloration on the occurrence of said change in color.

20. A cooking device as claimed in claim 19, wherein said catalyst further comprises a zeolite as a cracking catalyst which catalyzes thermal decomposition of oils and fats; each of said oxidation catalyst and said zeolite amounting to 5 to 50% by weight of the total of said glass frit, said matting agent, said ferrite and said catalyst.

* * * * *